United States Patent Office 3,575,966
Patented Apr. 20, 1971

3,575,966
ANTHRAQUINONE DYESTUFFS
Rütger Neeff, Leverkusen, and Gerhard Wolfrum, Opladen, Germany, assignors to Farbenfabriken Bayer Aktiengesellschaft, Leverkusen, Germany
No Drawing. Filed June 20, 1968, Ser. No. 738,353
Claims priority, application Germany, June 29, 1967, F 52,821
Int. Cl. C07d 41/06; C07c 49/68
U.S. Cl. 260—239.3         1 Claim

ABSTRACT OF THE DISCLOSURE

Dyestuffs of the formula

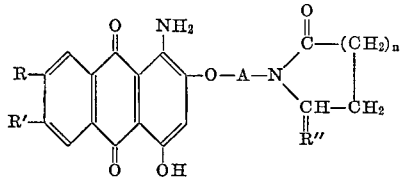

in which R and R' are hydrogen, chlorine or fluorine; R" is hydrogen or lower alkyl; A is a straight-chain or branched alkylene group with 2 to 6 carbon atoms which may be interrupted by oxygen and/or sulfur atoms; and n is an integer of 1 to 3; and their use in the dyeing and printing of synthetic fiber materials, e.g. polyester, polyamide, cellulose esters, are disclosed. The dyes give good yields and the dyeings exhibit good texture, fastness to light, thermofixing, washing, rubbing and ironing.

---

It has been found that valuable dyeings and prints are obtained on synthetic fibre materials by using, as dyestuffs, compounds of the formula

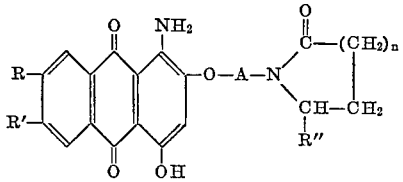

in which R and R' stand for hydrogen, chlorine or fluorine, R" is hydrogen or a lower alkyl radical, A is straight-chain or branched alkylene group with 2 to 6 carbon atoms which may be interrupted by oxygen and/or sulphur atoms, and $n$ stands for 1 to 3.

Instead of the pure dyestuffs, there may also be used mixtures thereof.

The dyestuffs used according to the invention can be obtained, for example, in known manner by reacting compounds of the formula

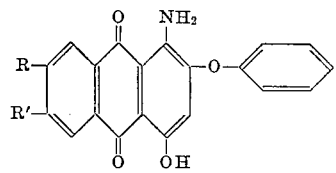

in which R and R' have the same meaning as above, with N-(hydroxyalkyl)-lactams of the formula

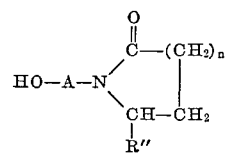

in which A, $n$ and R" have the same meaning as above, in the presence of basic agents such as sodium carbonate, potassium carbonate, sodium or potassium hydroxide, at temperatures of 100–150° C.

Suitable synthetic fibre materials are primarily linear aromatic polyesters, for example, polyethylene terephthalates or polyesters obtained from 1,4-bis-(hydroxymethyl)-cyclohexane and terephthalic acid, or other synthetic fibre materials, such as fibre materials of polyamides, polyurethanes, polyacrylonitrile, polyolefins, cellulose triacetate or cellulose 2½-acetate.

The dyeing and printing can be carried out by known methods. The dyestuffs are expediently used in a finely divided form. When dyeing polyethylene terephthalate fibres, the usual carriers can be added, or the dyeing can be carried out at 120–145° C. under pressure. The dyestuffs are also eminently suitable for dyeing by the thermosol process in which the printed or padded fibre materials are briefly heated to temperatures about 180–230° C., optionally after an intermediate drying. Heating is generally carried out for periods of time ranging from 30 seconds to 2 minutes.

The dyeings or prints obtained with dyestuffs used according to the invention are characterised by a very good texture, high dyestuff yield and by excellent fastness to light, thermofixing, washing, rubbing and ironing.

In the following examples the parts mean parts by weight, unless otherwise stated.

EXAMPLE 1

(a) A fabric of polyethylene terephthalate fibres is impregnated on a foulard with a liquor containing, per litre, 20 g. of the dyestuff of the formula

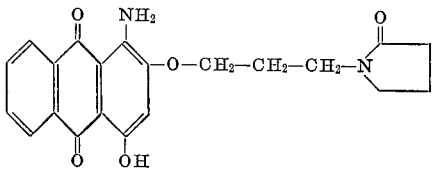

and 10 g. of a thermosol auxiliary, especially a polyether. The fabric is then squeezed to a weight increase of 70% and dried in a suspended nozzle drier or drying cabinet at 80–120° C. The fabric is subsequently treated in a stenter or nozzle hot flue at 190 to 220° C. with hot air for about 45 seconds, then rinsed, reductively after-treated, if desired, then washed, rinsed and dried. The reductive after-treatment to remove dyestuff particles which superficially adhere to the fibre can be carried out by introducing the fabric at 25° C. into a bath containing 3–5 cc./litre of a sodium hydroxide solution at 38° Bé. and 1–2 g./litre of concentrated hydrosulphite, heating the bath to 70° C. within about 15 minutes and keeping it at 70° C. for a further 10 minutes. The fabric is subsequently rinsed hot, acidified with 2–3 cc./litre of 85% formic acid at 50° C., rinsed and dried.

A brilliant red dyeing is obtained, which is characterised by its good dyestuff yield, very good texture and by excellent fastness properties, especially very good fastness to thermofixing, washing, rubbing and light.

An analogous dyeing is obtained when the polyethylene terephthalate fibres are replaced with polyester fibres obtained from 1,4-bis-(hydroxymethyl)-cyclohexane and terephthalic acid. A brilliant red dyeing is obtained in a similar manner, when the polyethylene terephthalate fibres are replaced with cellulose triacetate fibres or when polyamide or polyurethane fibres are used and thermosolisation is carried out at 190–215° C.

(b) A precleaned and thermofixed fabric of polyethylene terephthalate fibres is printed with a printing paste consisting of 40 g. of the dyestuff mentioned in Example 1(a), 475 g. of water, 645 g. of crystal gum 1:2, and 20 g. of sulphonated castor oil. The crystal gum may be replaced with an alginate thickening agent. For fixation of the dyestuff, the printed and dried material is passed at 190–200° C. over a high capacity stenter or through a condensation apparatus. The duration of the treatment is about 30–60 seconds. The fixed print so obtained is subsequently rinsed cold, soaped with 1–2 g./liter of an anionactive detergent at 70–80° C. for about 10 minutes, rinsed first hot and then cold, and dried.

A print is obtained, which corresponds to the dyeing of Example 1(a) and is characterised by the same outstanding fastness properties. A brilliant red print is obtained in a similar manner when the polyethylene terephthalate fibres are replaced with cellulose triacetate, polyamide or polyurethane fibres.

(c) 100 parts of polyethylene terephthalate fibres are dyed with 1 part of the finely divided dyestuff mentioned in Example 1(a) in 4000 parts of water in the presence of 15 parts o-cresotic acid methyl ester as carrier, at 100° C. and pH 4.5 for 1½ hours. A brilliant red dyeing is obtained, which is characterised by very good texture and very good fastness to washing, thermofixing and light. A similar dyeing is obtained when the dyeing is carried out in the absence of a carrier at 125–130° C. for 2 hours.

When 100 parts cellulose triacetate are dyed with 1 part of the finely divided dyestuff mentioned in Example 1(a) in 3000 parts of water at 100° C. for 1 hour, then a brilliant red dyeing of very good fastness to washing, thermofixing and light is again obtained.

(d) 10 parts of polyamide fibres are dyed in a bath consisting of 400 parts of water, 0.2 part of a conventional dispersing agent and 0.2 part of the finely divided dyestuff mentioned in Example 1(a), at boiling temperature for 1 hour. A brilliant red dyeing of very good fastness properties is obtained. Equally good results are obtained when the polyamide fibres are replaced with polyurethane fibres.

(e) 20 parts cellulose 2½-acetate fibres are dyed in a bath consisting of 600 parts of water, 1 part of Marseilles soap and 0.2 part of the finely divided dyestuff mentioned in Example 1(a), at boiling temperature for 1 hour. A brilliant red dyeing of good fastness to light and washing is obtained.

(f) The dyestuff mentioned in Example 1(a) can be prepared, for example, as follows: 70 parts N-(γ-hydroxypropyl)-pyrrolidone-(2), 9 parts potassium carbonate and 15 parts 1-amino-2-phenoxy-4-hydroxy-anthraquinone are heated at 125–130° C. until the starting material can no longer be detected by chromatography. The mixture is subsequently diluted with methanol, the dyestuff of the formula

[structure: 1-amino-4-hydroxy-2-(O—CH$_2$—CH$_2$—CH$_2$—N-pyrrolidone) anthraquinone]

which crystallises in the form of bluish red small needles is filtered off with suction and after stirring with dilute hydrochloric acid, there are obtained 15.5 parts of dyestuff=90% of theory.

$C_{21}H_{20}N_2O_5$ (380.3).—Calculated (percent): N, 7.37. Found (percent): N, 7.21.

EXAMPLES 2–34

Brilliant red dyeings or prints of very good fastness to light, washing, rubbing and thermofixing are also obtained when fibres of polyethylene terephthalate, cellulose triacetate, polyamide or polyurethane are dyed or printed according to Example 1(a) to 1(d) with the following dyestuffs prepared in analogy with Example 1(f):

[anthraquinone structure with NH$_2$ and OR, OH substituents]

Example

2  R = —CH$_2$—CH$_2$—N(pyrrolidone, 5-ring C=O)

3  R = —CH$_2$—CH$_2$—CH$_2$—CH$_2$—N(pyrrolidone, 5-ring C=O)

4  R = —CH$_2$—CH$_2$—N(piperidone, 6-ring C=O)

5  R = —CH$_2$—CH$_2$—CH$_2$—N(piperidone, 6-ring C=O)

6  R = —CH$_2$—CH$_2$—CH$_2$—CH$_2$—N(piperidone, 6-ring C=O)

7  R = —CH$_2$—CH$_2$—N(7-ring C=O)

[anthraquinone structure with NH$_2$ and OR, OH substituents]

Example

8  R = —CH$_2$—CH$_2$—CH$_2$—N(7-ring C=O)

9  R = —CH$_2$—CH$_2$—CH$_2$—CH$_2$—N(7-ring C=O)

10  R = —CH(CH$_3$)—CH$_2$—N(pyrrolidone 5-ring C=O)

11  R = —CH(CH$_3$)—CH$_2$—CH$_2$—N(pyrrolidone 5-ring C=O)

12  R = —CH(CH$_3$)—CH$_2$—N(piperidone 6-ring C=O)

13  R = —CH(CH$_3$)—CH$_2$—CH$_2$—N(piperidone 6-ring C=O)

14  R = —CH(CH$_3$)—CH$_2$—N(7-ring C=O)

15 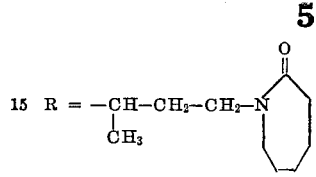

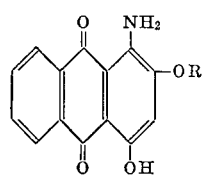

Example

16 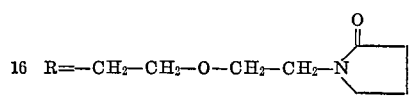

17 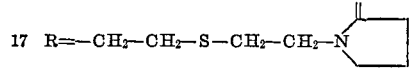

18 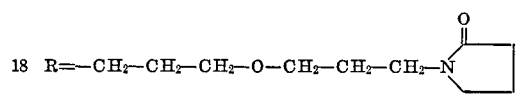

19 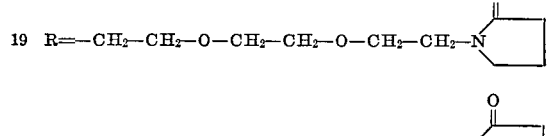

20 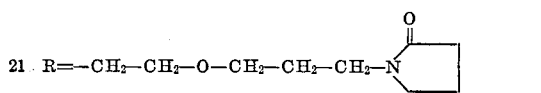

21 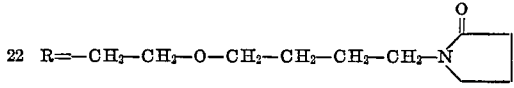

22 

23 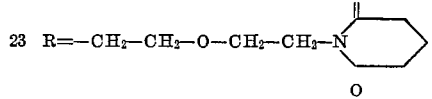

24 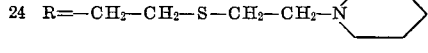

25 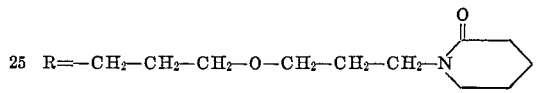

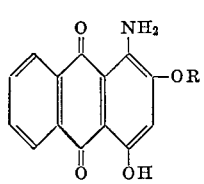

Example

26 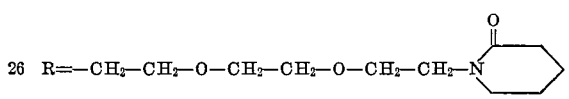

27 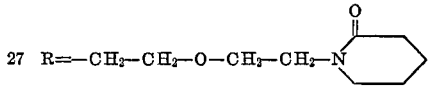

28 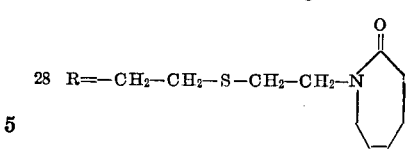

29 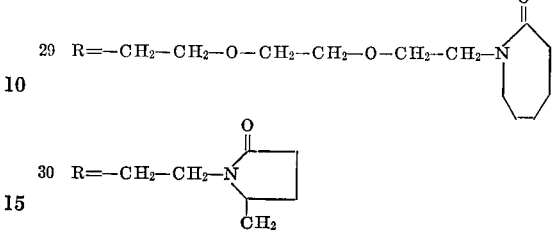

30 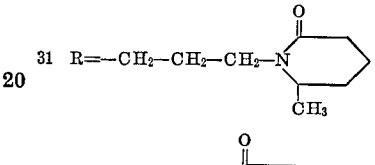

31 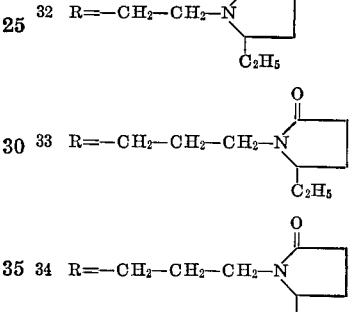

32 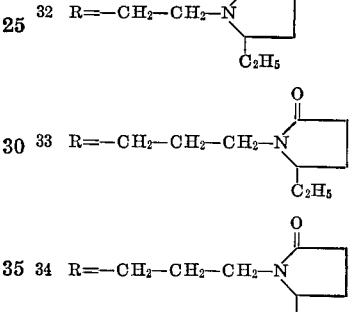

33 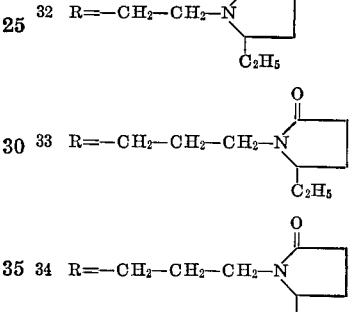

34 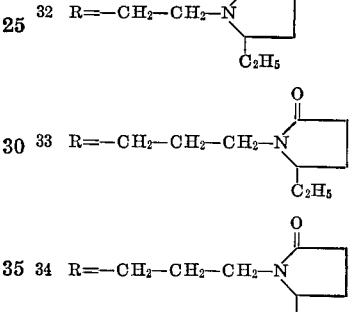

EXAMPLE 35

(a) A fabric of polyethylene terephthalate fibres is dyed according to Example 1(a) with a bath containing, per litre, 20 of the dyestuff of the formula

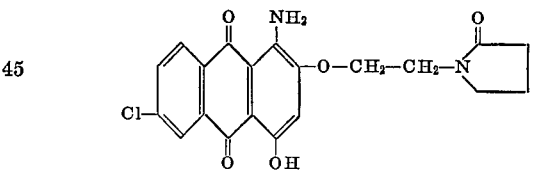

and there is thus obtained a brilliant red dyeing which has excellent fastness properties, in addition to a high dyestuff yield and very good texture. Brilliant red prints are obtained when polyethylene terephthalate fibres are printed with the above dyestuff according to Example 1(b), or when the polyethylene terephthalate fibres are replaced with polyamide, polyurethane or cellulose triacetate fibres.

(b) The dyestuff mentioned in Example 35(a) can be prepared, for example, as follows: 70 parts N-(β-hydroxyethyl)-pyrrolidone-(2), 9 parts potassium carbonate and 16.5 parts 1-amino-2-phenoxy-4-hydroxy-6-chloroanthraquinone are heated at 125–130° C. until the starting material can no longer be detected by chromatography. The mixture is subsequently diluted with methanol, the dyestuff of the formula

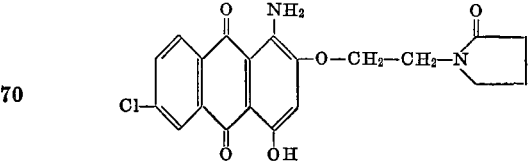

which crystallises in the form of bluish red prisms is filtered off with suction, and after stirring with dilute hydrochloric acid, there are obtained 16.5 parts of dyestuff=91.5% of theory.

$C_{20}H_{17}ClN_2O_5$ (400.8).—Calculated (percent): N, 7.03; Cl, 8.86. Found (percent): N, 7.18; Cl, 8.65.

EXAMPLES 36–81

Brilliant red dyeings or prints of very good fastness to light, washing, rubbing and thermofixing are also obtained when fibres of polyethylene terephthalate, cellulose triacetate, polyamide or polyurethane are dyed according to Example 1(a) or printed according to Example 1(b) with the following dyestuffs prepared in analogy with Example 35(b):

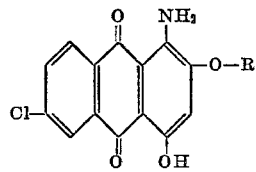

Example

| | |
|---|---|
| 36 | 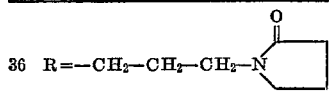 |
| 37 | 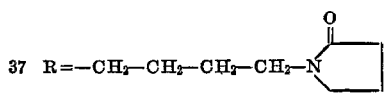 |
| 38 | 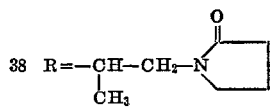 |
| 39 | 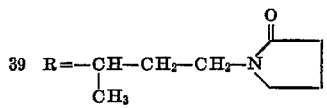 |
| 40 | 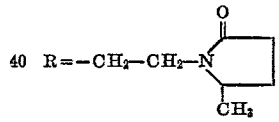 |

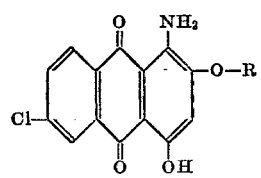

Example

| | |
|---|---|
| 41 | 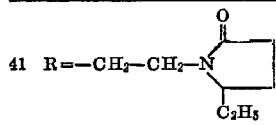 |
| 42 | 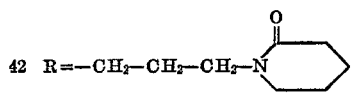 |
| 43 | 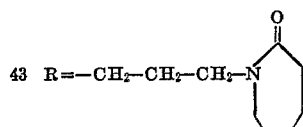 |
| 44 | 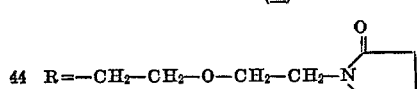 |
| 45 | 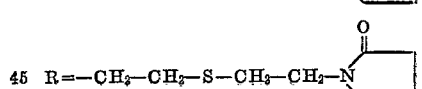 |

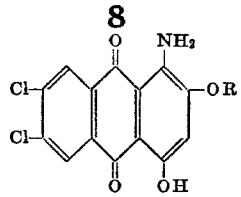

Example

| | |
|---|---|
| 46 | 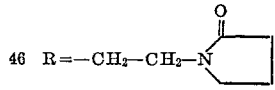 |
| 47 | 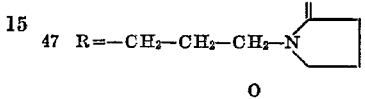 |
| 48 | 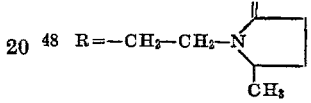 |

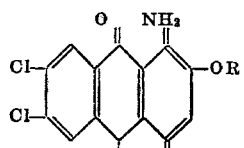

Example

| | |
|---|---|
| 49 | 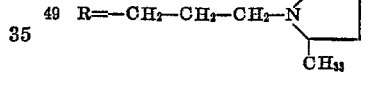 |
| 50 | 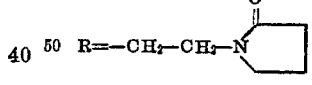 |
| 51 | 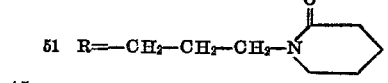 |
| 52 |  |
| 53 | 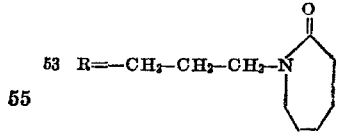 |
| 54 | 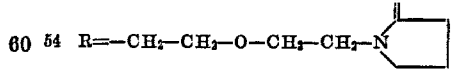 |

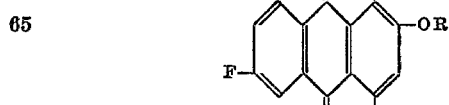

Example

| | |
|---|---|
| 55 | 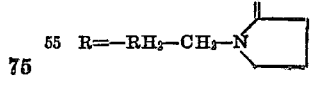 |

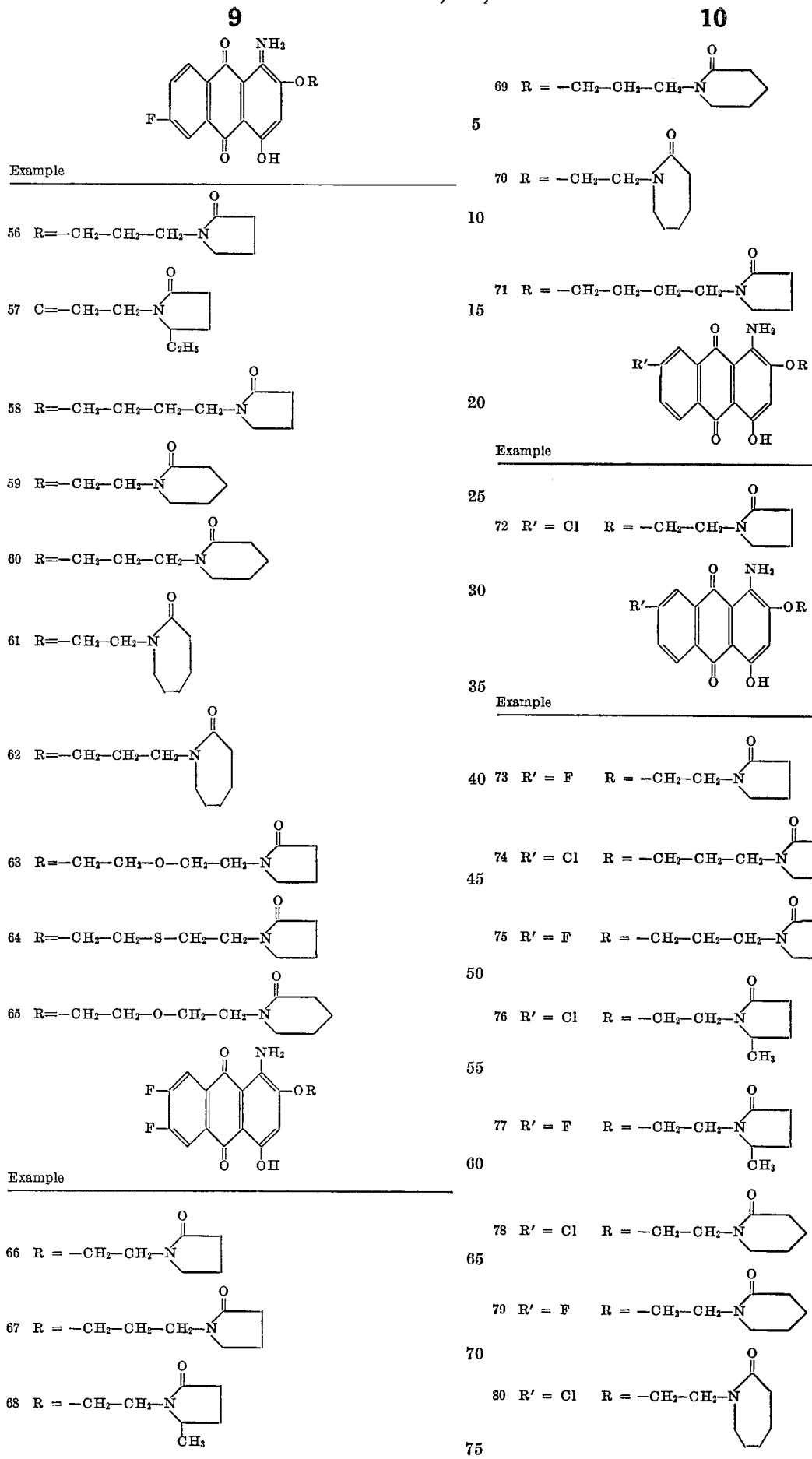

81  R' = F    R = —CH₂—CH₂—N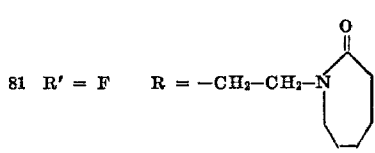

What is claimed is:
1. A compound of the formula

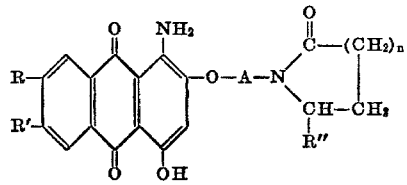

in which R and R' stand for hydrogen, chlorine or fluorine, R" is hydrogen or lower alkyl, A is a straight-chain or branched alkylene group with 2 to 6 carbon atoms which may be interrupted by oxygen and/or sulphur atoms, and $n$ stands for 1 to 3.

References Cited
UNITED STATES PATENTS

| | | | |
|---|---|---|---|
| 3,036,078 | 5/1962 | Grossmann et al. | 260—377 |
| 3,236,865 | 2/1966 | Jarrett | 260—377 |
| 3,288,778 | 11/1966 | Blout et al. | 260—377 |
| 3,497,527 | 2/1970 | Randall et al. | 260—239.3 |

HENRY R. JILES, Primary Examiner

R. T. BOND, Assistant Examiner

U.S. Cl. X.R.

8—39; 260—294.7F, 326.5C, 377